United States Patent

Mickas

[11] 3,804,426
[45] Apr. 16, 1974

[54] MACHINING APPARATUS WITH AUTOMATIC TOOL CHANGING MEANS

[75] Inventor: George Mickas, Grosse Pointe Woods, Mich.

[73] Assignee: Ex-Cell-O Corporation, Detroit, Mich.

[22] Filed: Apr. 14, 1971

[21] Appl. No.: 133,922

Related U.S. Application Data

[62] Division of Ser. Nos. 703,148, Feb. 5, 1968, Pat. No. 3,516,149, and Ser. No. 889,826, Dec. 23, 1969, abandoned.

[52] U.S. Cl. ............... 279/103, 90/11 D, 279/1 TS, 279/1 B
[51] Int. Cl. ................................................ B23b 29/04
[58] Field of Search ............ 29/568, 26 A; 90/11 D; 279/1 TS, 1 B, 1 A, 103; 408/239 A

[56] References Cited
UNITED STATES PATENTS

| | | |
|---|---|---|
| 3,316,629 | 5/1967 | Meyer .................................. 29/568 |
| 3,344,511 | 10/1967 | Hosea .................................. 29/568 |
| 3,520,228 | 7/1970 | Wohlfeil ........................... 29/568 X |
| 3,477,121 | 11/1969 | Martin ................................. 29/568 |
| 3,288,032 | 11/1966 | Pankonin et al. ................. 29/26 A |
| 3,312,370 | 4/1967 | Kolarich et al. ................. 29/568 X |
| 3,300,856 | 1/1967 | Daugherty ........................... 29/568 |
| 3,516,149 | 6/1970 | Mickas ................................. 29/568 |
| 3,233,321 | 2/1966 | Anthony .............................. 29/568 |

FOREIGN PATENTS OR APPLICATIONS 1,235,705   3/1967   Germany .............................. 29/568

Primary Examiner—Andrew R. Juhasz
Assistant Examiner—Z. R. Bilinsky
Attorney, Agent, or Firm—James H. Bower; Mitchell J. Hill

[57] ABSTRACT

A horizontal spindle machine that is constructed and arranged to carry out a variety of machining operations such as milling, drilling, boring, tapping and the like, and which includes an automatic tool changing means for transferring tools in a predetermined sequence between a tool storage conveyor and a tool spindle. The machine includes a work table mounted on a rotary index table that is carried on two movable, perpendicularly disposed members to provide movement of the work table along the "X" and "Z" axes. The tool spindle is slidably mounted on the front side of a rigid column for movement along the "Y" axis. The tool storage conveyor is mounted on the left side of the rigid column on the operator's side of the machine. The tool changing means includes a transfer arm for transferring tools between the storage conveyor and a 90° tool turn around means, and a second transfer arm for transferring tools between the 90° turn around means and the tool spindle.

2 Claims, 9 Drawing Figures

3,804,426

MACHINING APPARATUS WITH AUTOMATIC TOOL CHANGING MEANS

This is a division of parent application Ser. No. 703,148 filed Feb. 5, 1968, now U.S. Pat. No. 3,516,149, and copending application Ser. No. 889,826 filed Dec. 23, 1969 and now abandoned.

SUMMARY OF THE INVENTION

This invention relates generally to the machining art, and more particularly, to a horizontal spindle machine tool capable of performing various machining operations such as milling, drilling, boring, tapping and the like, and which is provided with an automatic tool changing means for transferring tools in a predetermined sequence between a tool storage means and a tool spindle to provide the tool spindle with the necessary tools for carrying out said various machining operations.

The prior art machine tools which are constructed to carry out automatically a sequence of machining operations have many inherent disadvantages. For example, some of the prior art machines of this type are each provided with a tool storage drum that is carried on a tool spindle carrier which is a movable member whereby the tool spindle is subject to inaccuracy because of this construction. It has been found that where the tools are stored on the spindle carrier, the spindle carrier is subject to deflection, whereby the machine is not capable of carrying out accurately the machining operations for which it was designed. A further disadvantage of other prior art machines of this type is that the tools are mounted on a movable column which is a massive member and which is difficult to move and position accurately relative to a tool spindle. Another disadvantage of the prior art machines of this type is that the tool storage means is disposed in a position where the operator of the machine does not have full visibility of the tools while they are in storage, and the storage means is not accessible to the operator for manual changing of the tools while the machine is running. A further disadvantage of such prior art machines is that they are not adapted to handle extra long tools, and a large time interval is necessary to withdraw one tool and insert another into the tool spindle. A still further disadvantage of such prior art machines is that they employ draw bars for pulling a tool into the spindle and for holding the tool in place, and such a construction is detrimental in that the repeated pulling force exerted by the draw bar is a source of inaccuracy.

Accordingly, in view of the foregoing, it is an important object of the present invention to provide an improved machining apparatus which is capable of automatically carrying out a variety of machining operations and which overcomes the aforementioned disadvantages of the similar prior art machines.

The automatic machining apparatus described herein as an illustrative embodiment of the invention is a horizontal spindle machine tool which is capable of performing a variety of machining operations such as milling, drilling, boring, tapping and the like. The machine tool illustrated herein includes an automatic tool changing means which is adapted to transfer tools between a tool spindle and a storage means capable of storing thirty-two tools. The machine is provided with a work table that is adapted to carry a workpiece on which is to be performed a variety of operations. The work table is carried on an index table which is rotatably mounted in a table slide assembly that is movable on the "Z" axis toward or away from the tool spindle. The table slide assembly is carried on a saddle slide assembly that is adapted to move left or right along the "X" axis.

The machine further includes a stationary rigid column disposed on a rear base, with the column front face adjacent the work table. A rotatable tool spindle is movably supported on ways on the front face of the rigid column for vertical movement along the "Y" axis. The tool spindle includes means for automatically clamping a tool in the spindle for a machining operation on the workpiece carried on the work table. A tool storage means is secured to a side of the column, preferably on the left side or operator's side where the tools in the storage means are visible at all times to the operator, and whereby the operator may manually insert extra long tools or special tools into the 90° turn around means for transfer to the tool spindle. The machine is provided with a tool transfer means which comprises a first tool transfer arm movably mounted on the side of the rigid column on which the tool storage is mounted for transferring tools between the tool storage means and a 90° turn around means situated at a front corner on the rigid column. The tool transfer means further includes a second tool transfer arm movably mounted on the front of the rigid column for transferring tools between the 90° turn around means and the tool spindle. The machine is adapted for control by a numerical control means whereby the tools may be withdrawn and inserted into the tool spindle in a predetermined or programmed manner, as desired.

It is another object of the present invention to provide a machining apparatus which is capable of carrying out automatically a variety of machining operations and which is provided with an automatic tool changing means that includes a tool storage means mounted on a side of a rigid column and wherein the machine tool spindle is mounted on the front face of the rigid column and is not affected by the weight of the tool storage means whereby the machining apparatus is adapted to perform machining operations with a high degree of accuracy.

It is still another object of the present invention to provide an automatic machining apparatus which is provided with an automatic tool changing means that is adapted to employ a tool control system, whereby the machining apparatus may be operated by an automatic control means such as a numerical control means.

It is a further object of the present invention to provide an improved automatic machining apparatus which is capable of carrying out a variety of machining operations in a predetermined sequence, and which is provided with a tool spindle having an automatic clamping means and an improved tool holder means, whereby a tool may be quickly and accurately inserted into the tool spindle and clamped in place.

It is still a further object of the present invention to provide an improved automatic machining apparatus which comprises a work table for supporting a workpiece for movement along the "X" and "Z" axes, a rigid support column having a front face disposed adjacent said work table, a rotatable tool spindle movably mounted on ways secured to the front face of the rigid column for vertical movement along the "Y" axis, a tool storage means disposed on the left side of said rigid column, a 90° tool turn around means operatively mounted on the rigid column adjacent the front left corner, a first tool transfer means operatively mounted between said tool storage means and said tool turn around means for transferring tools between said tool storage means and said tool turn around means, and a second tool transfer means for transferring tools between said tool turn around means and the tool spindle.

It is another object of the present invention to provide a novel and improved tool transfer means for an automatic machining apparatus and which includes a movably mounted arm having a C-shaped tool holder engaging portion that is adapted to engage a tool holder in a substantially V-shaped peripheral recess formed on the tool holder, and which is secured to the tool holder by a releasable locking means.

It is still another object of the present invention to provide a novel and improved tool holder for use in an automatic machining apparatus that is provided with an automatic tool changing mechanism.

Other objects, features and advantages of this invention will be apparent from the following detailed description, appended claims, and the accompanying drawings.

GENERAL DESCRIPTION

Figure 1:
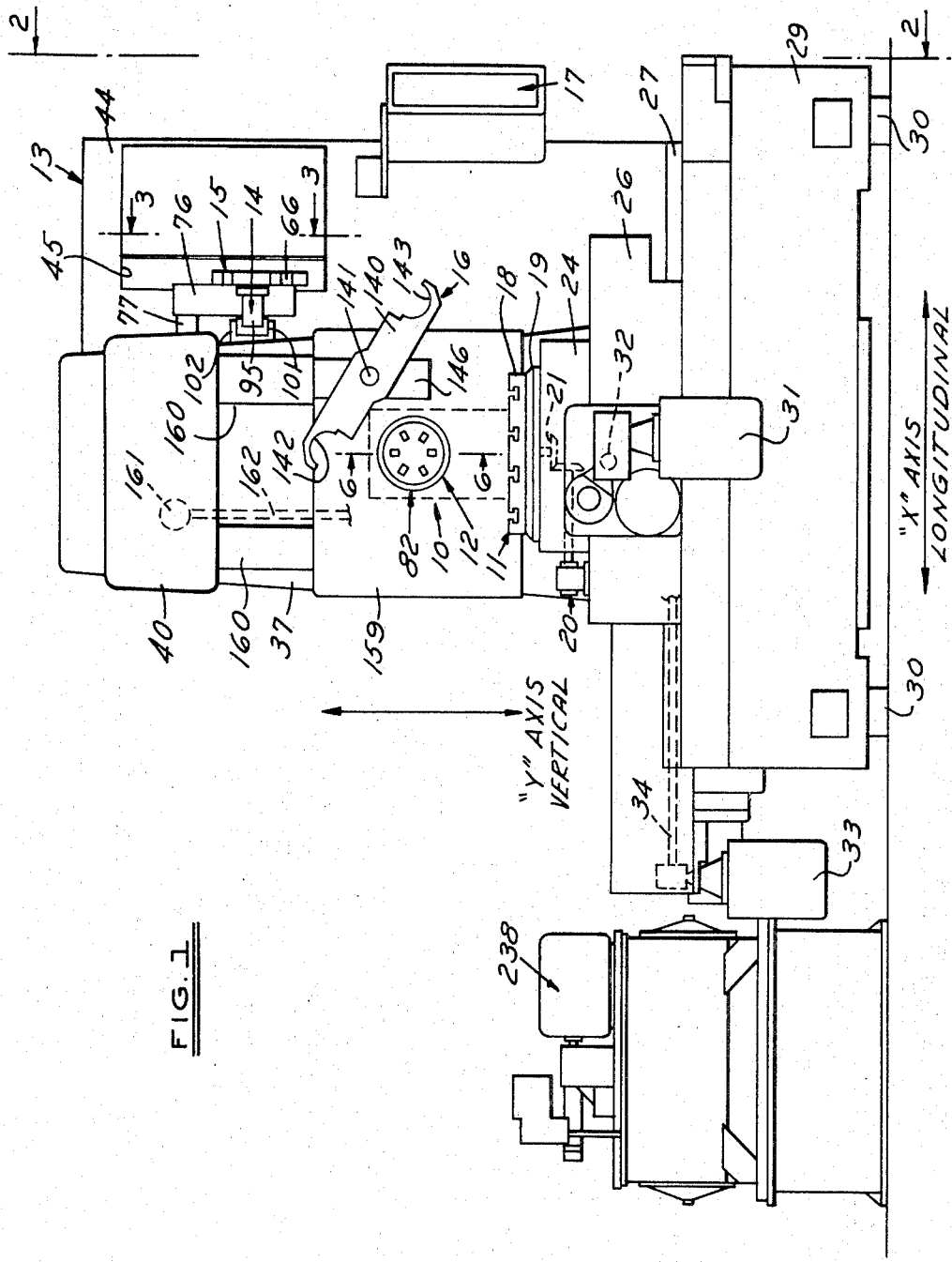
FIG. 1 is an illustrative embodiment of a machine tool made in accordance with the principles of the present invention.
Figure 2:
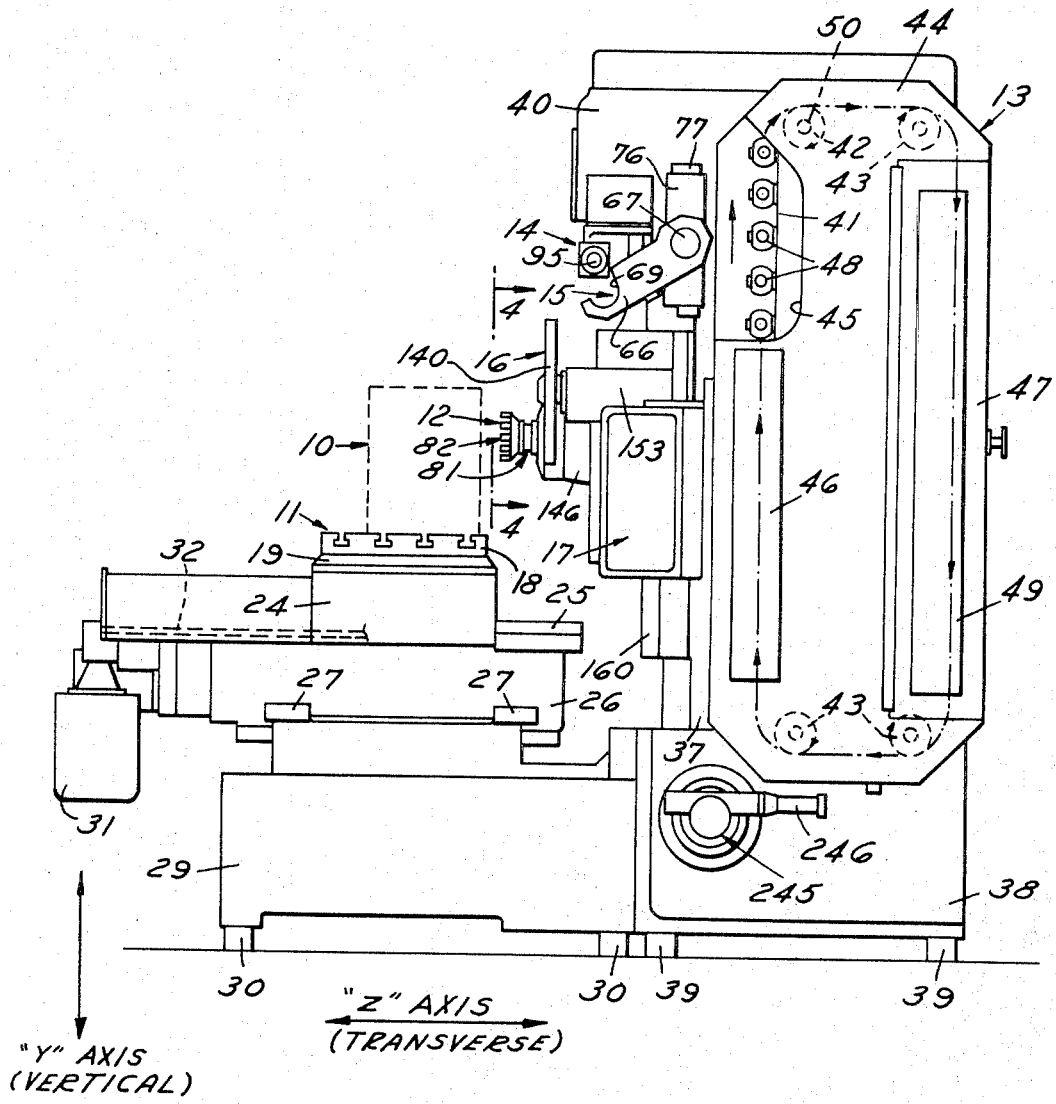
FIG. 2 is a left side elevational view of the structure illustrated in FIG. 1, taken along the line 2—2 thereof, and looking in the direction of the arrows.

The illustrated machining apparatus is a horizontal spindle machine tool which is capable of performing a variety of milling, drilling, boring, tapping and associated operations on a workpiece. As shown in FIGS. 1 and 2, the illustrative embodiment of the invention is adapted to perform various machining operations on a workpiece 10 that is carried on a workpiece support means generally indicated by the numeral 11 and which is adapted to provide movement to the workpiece 10 along the "X" and "Z" axes and about a rotary axis.

The numeral 12 generally designates a tool spindle which is mounted for vertical movement along the "Y" axis. The numeral 13 generally indicates a tool storage means which is mounted on the left side or operator side of the machine. A 90° tool turn around means is operatively mounted on the front left corner of the machine and it is generally indicated by the numeral 14. The numeral 15 generally designates a first tool transfer means that is constructed and arranged for transferring tools between the tool storage means 13 and the 90° tool turn around means 14. The numeral 16 generally designates a second tool transfer means which is constructed and arranged for transferring tools between the 90° tool turn around means 14 and the spindle 12. An operator's control panel 17 is positioned on the left side, or operator's side, of the machine.

WORKPIECE SUPPORT MEANS

The workpiece support means 11 includes a work table 18 which is improved with a square top having conventional T-slots formed therein for securing the workpiece 10 thereto. The work table 18 is fixed to an index table 19 which is adapted to rotate the workpiece 10 around a vertical axis. The index table 19 may be rotated by any suitable drive means, as for example, by an electric drive motor 20 and a suitable drive train 21, as shown in FIG. 1. The index table 19 and its drive means 20, 21 are operatively supported on a table slide assembly 24 which is slidably mounted on ways 25 for movement along the "Z" axis toward and away from the spindle 12. As shown in FIGS. 1 and 2, the table slide assembly ways 25 are carried on a saddle slide assembly 26 which is movable along the "X" axis on ways 27 which are carried on a front base 29. The base 29 is supported by a plurality of leveling jacks 30.

As shown in FIGS. 1 and 2, the table slide assembly 24 is moved inwardly and outwardly on the ways 25 by any suitable means, as by the electric motor 31 which is mounted on the saddle slide assembly 26 and which drives a lead screw 32 that is connected to a conventional cooperating nut member (not shown) carried on the table slide assembly 24. As shown in FIG. 1, the saddle slide assembly 26 is moved along the ways 27 by a suitable drive means similar to that employed for moving the table slide assembly 24. The numeral 33 generally indicates an electric motor mounted on the front base 29 and which is adapted to rotate a lead screw 34 that is attached to a conventional nut member or ball screw (not shown) carried on the saddle slide assembly 26.

TOOL STORAGE MEANS

As shown in FIG. 2, the tool storage means 13 is fixed to the left side of a rigid, stationary machine column 37 which is supported on a rear base 38. The rear base 38 is mounted on a plurality of leveling jacks 30. As shown in FIGS. 1 and 2, the column 37 carries a crown or head 40 on the upper end thereof in which is housed the drive means for the tool storage means 13. As shown in FIG. 2, the tool storage means 13 includes an endless conveyor chain 41 that is mounted around a plurality of sprockets. The conveyor chain 41 is enclosed by a housing 44. The conveyor chian 41 is mounted at its upper end around a drive sprocket 42 and an upper idler sprocket 43 which are disposed in the upper end of the housing 44. The chain conveyor 41 is mounted at its lower end around a pair of laterally spaced apart idler sprockets 43 which are disposed in the lower end of the housing 44.

As shown in FIGS. 1 and 2, the tool storage means housing 44 is provided with an opening 45 at its left front corner for the reception of the first tool changing means 15 for transferring tools to and from the tool carriers 48 which are disposed in evenly spaced positions on, and which form a part of, the chain 41. As shown in FIG. 2, the tool storage housing 44 is provided with a window 46 on the outer side thereof adjacent the front left corner. The housing 44 is provided with a rear access door (not shown) and an access door 47 at the left rear corner thereof for loading tools into the tool carriers 48 on the chain 41. The door 47 is provided with a window 49.

Figure 8:
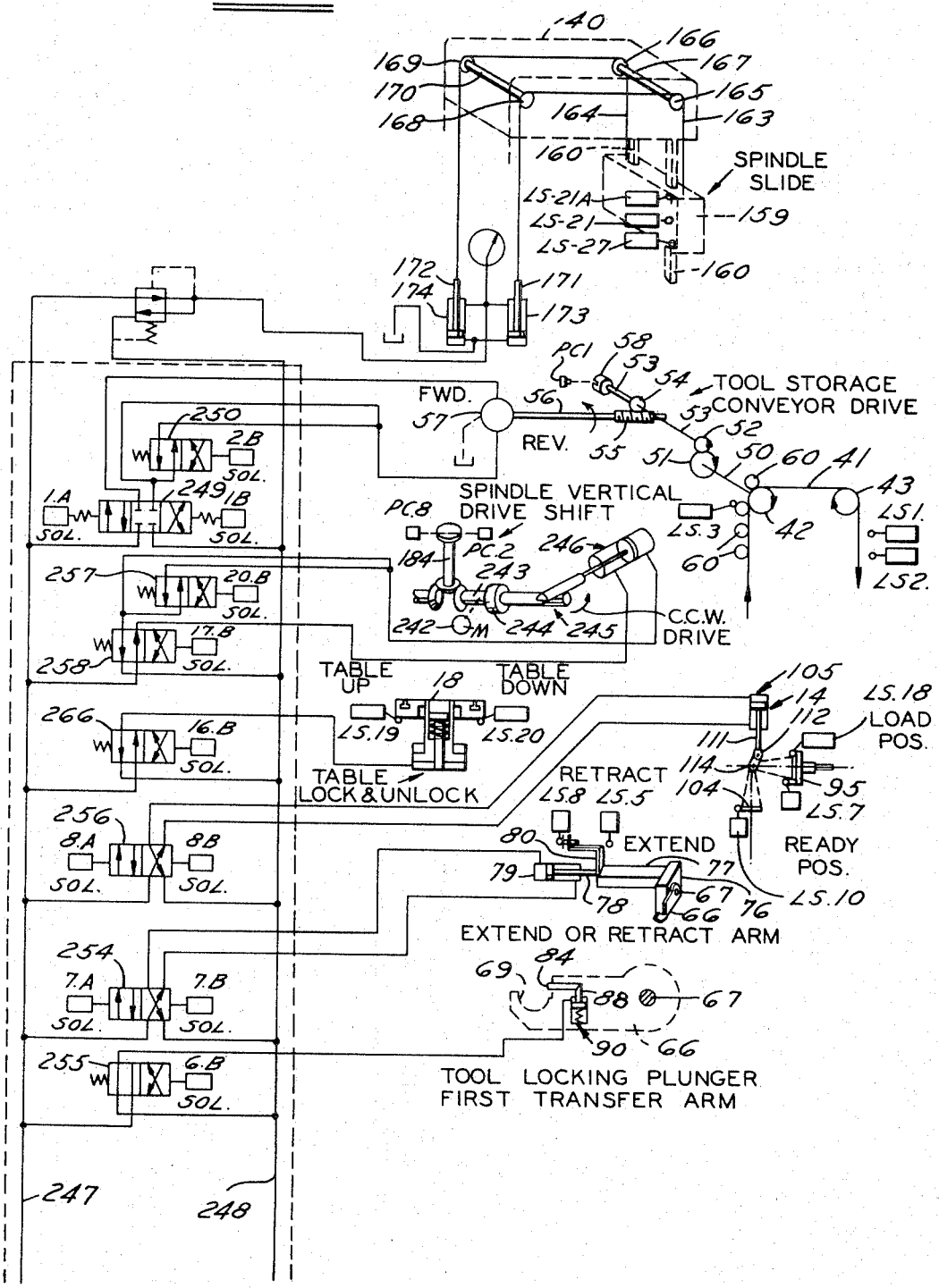

As shown in FIG. 2 the conveyor chain drive sprocket 42 is fixed on a rotatable drive shaft 50. As shown in FIG. 8, the drive shaft 50 is adapted to be driven by a gear 51 which is driven by a gear 52 carried on a drive shaft 53. The drive shaft 53 is driven through a cone drive reducer means consisting of a worm wheel 54 and a worm 55. The worm 55 is connected to the drive shaft 56 of a suitable fluid motor 57. The output of the fluid motor 57 rotates in synchronism with the conveyor chain 41 and with each revolution of the worm wheel 54 a new tool is moved into the tool pickup position shown in FIG. 3. A transducer in the form of a photo electric cell PC1 is mounted on the cone drive reducer means and generates a conveyor control signal as described in detail hereinafter. As shown in FIG. 8, a rotating disc 58 having a 1/16 inch slit is carried on the shaft 53 which is connected to the worm wheel 54. The rotating disc 58 functions with the photo cell PC1 to generate the aforementioned control signal.

In sequence mode, one of the tool holders 48, termed a first tool holder, is provided with a first tool trip dog 60 (FIG. 5) and thereafter a photoelectric cell in the control system takes over in sequence. The first tool trip dog 60 comprises a button head screw on the backside of the first tool holder 60 which is adapted to trip LS-3 (FIG. 8). The numeral 61 in FIG. 3 designates a coded tool key carriage arm which is integrally formed as a part of the casting for the tool holder 48.

Figure 3:
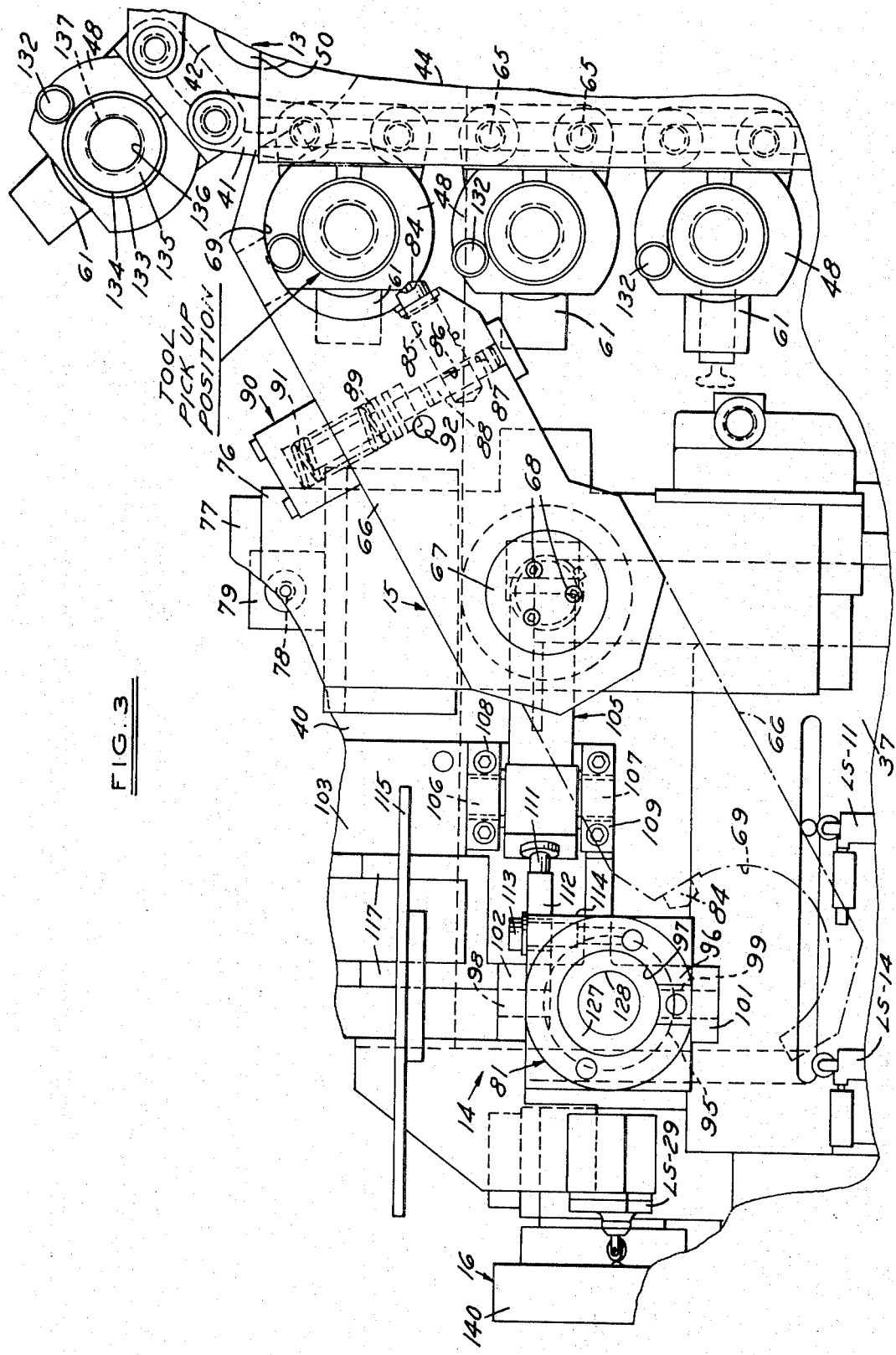
FIG. 3 is a fragmentary, enlarged, side elevational view of the structure illustrated in FIG. 1, taken along the line 3—3 thereof, and looking in the direction of the arrows.

As shown in FIG. 3, each of the tool carriers 48 is secured between the two courses of conveyor chain links 41 by a pair of shafts 65 mounted on suitable bearings, thereby making up the complete conveyor chain.

FIRST TOOL TRANSFER MEANS

Figure 9:
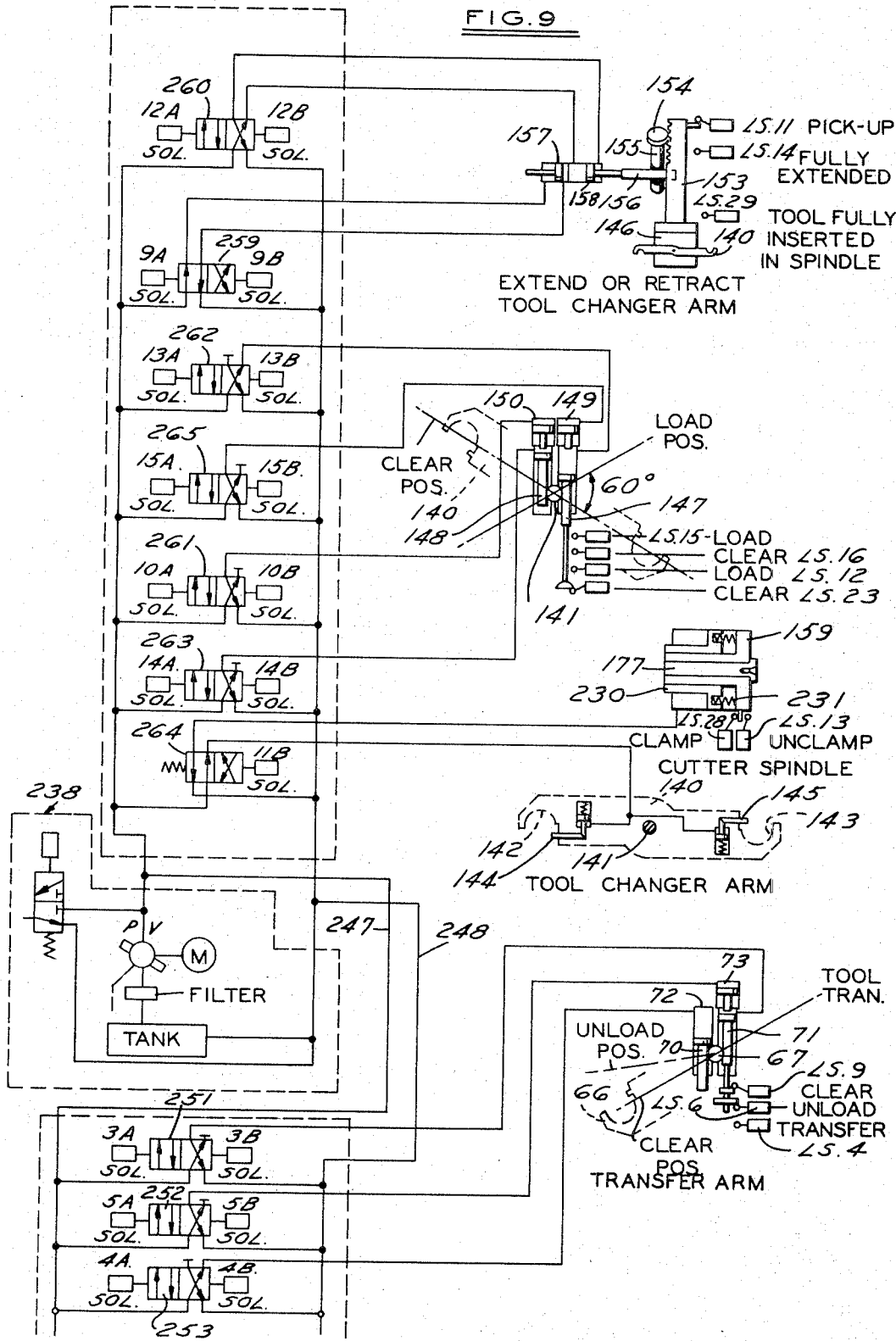

As shown in FIGS. 1 and 3, the first tool transfer means 15 is operatively mounted on the left side of the crown member 40 and it comprises a tool transfer arm 66 which has one end secured to a rotary oscillating shaft 67 by the socket head screws 68. The other end of the tool transfer arm 66 is provided with a semicircular recess on one side thereof to form a C-shaped tool holder engaging portion 69. As shown in FIG. 9 the shaft 67 is adapted to be oscillated in a rotary manner by two gear racks 70 and 71 which form the cylinder rods of a pair of hydraulic cylinders 72 and 73, respectively. The tool transfer arm 66 is adapted to be rotated to three positions, namely, a tool transfer or conveyor position, an unload position, and a clear position. The hydraulic cylinders 72 and 73 are operatively mounted in a vertical housing 76 that is carried on the outer end of a horizontal slide 77, as shown in FIGS. 1 and 8. As shown in FIG. 8, the slide 77 is connected to a cylinder rod 78 of a hydraulic cylinder 79. The slide 77 carries a switch operating arm 80 for operating the limit switches LS-5 and LS-8, when the hydraulic cylinder 79 is operated to extend or retract the tool transfer arm 66, as more fully explained hereinafter.

Figure 4:
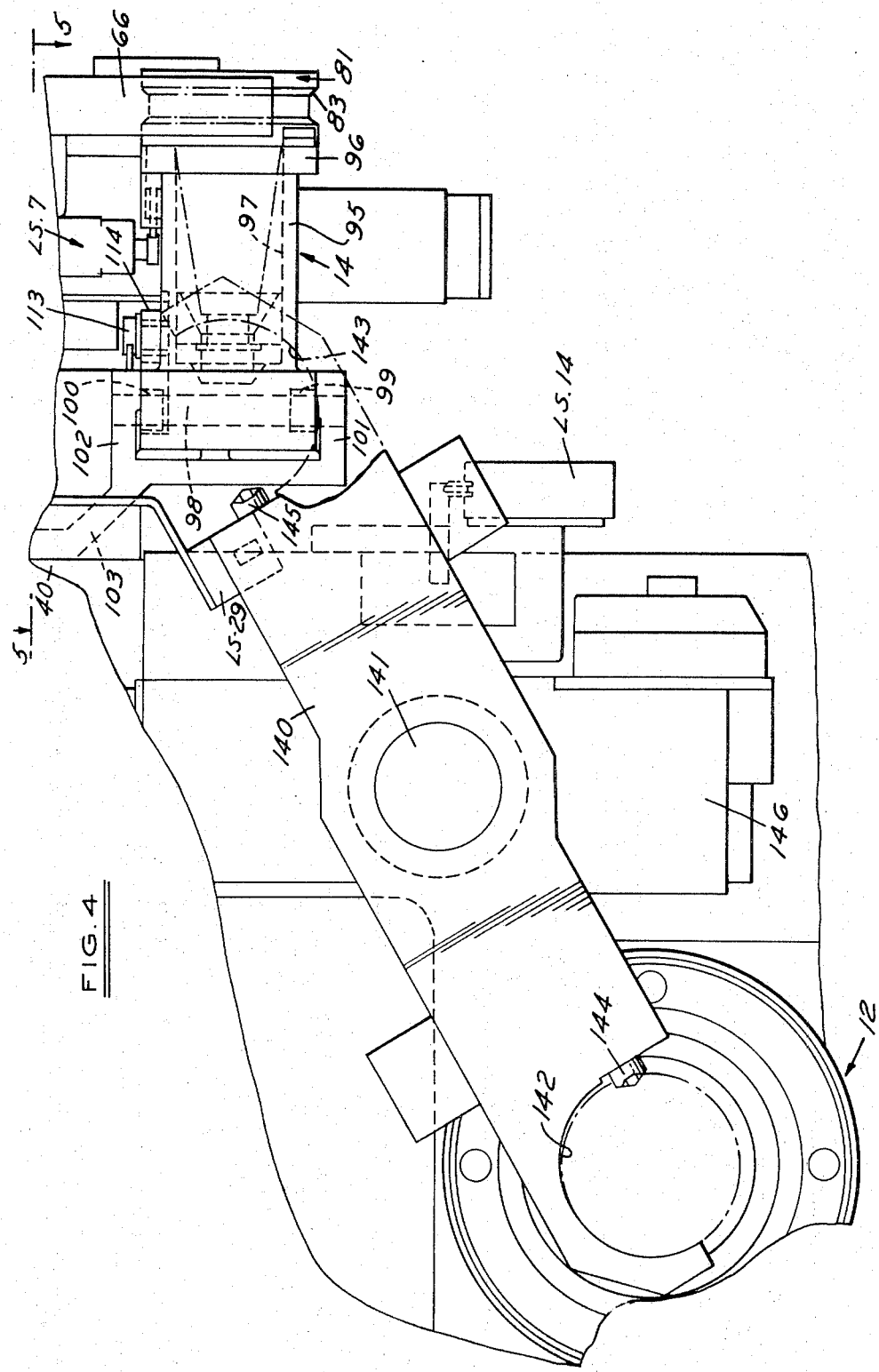
FIG. 4 is a fragmentary, enlarged, elevation view of the structure illustrated in FIG. 2, taken along the line 4—4 thereof, and looking in the direction of the arrows.
Figure 6:
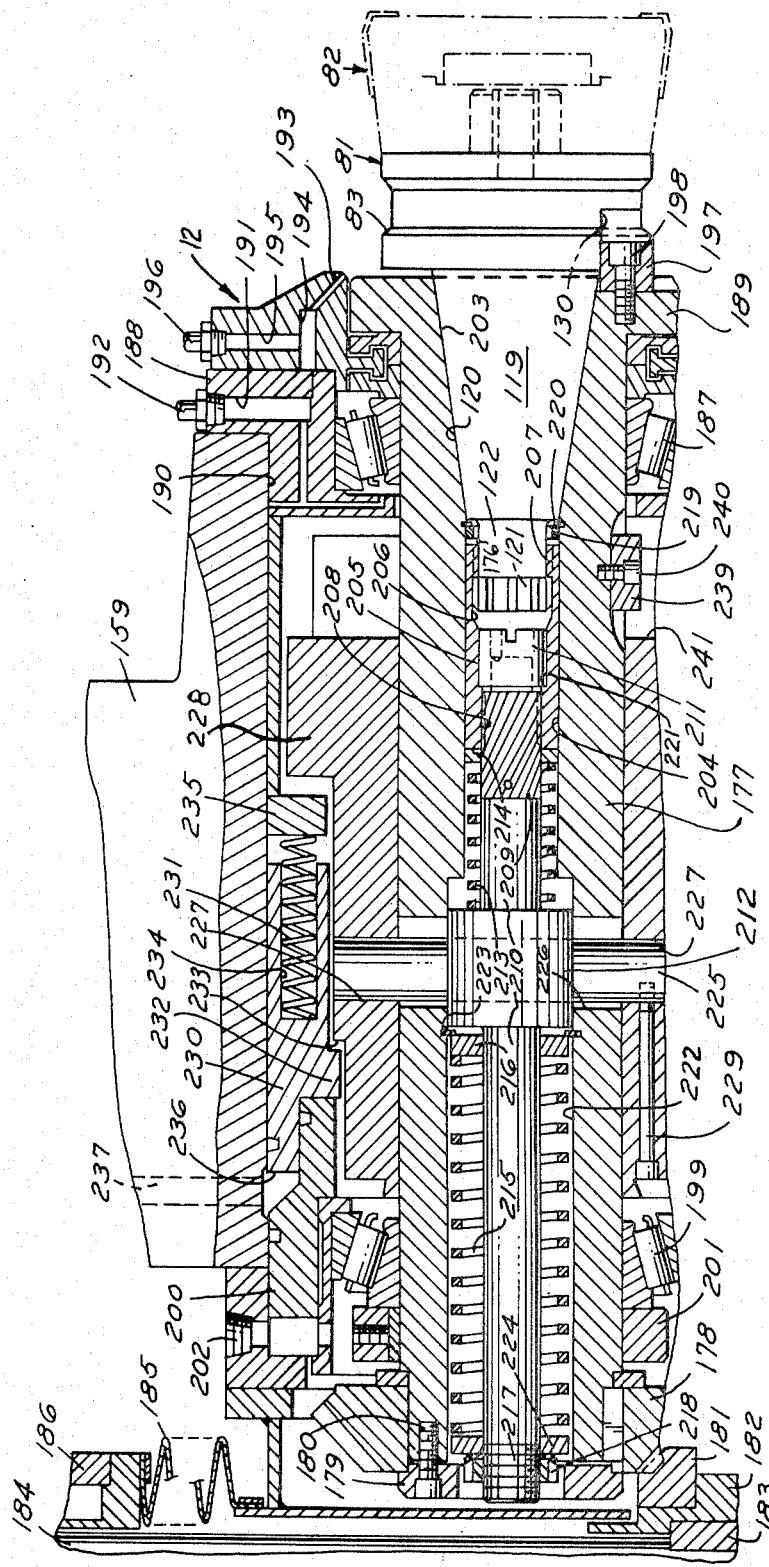
FIG. 6 is a fragmentary, enlarged, elevational section view of the structure illustrated in FIG. 1, taken along the line 6—6 thereof, and looking in the direction of the arrows.

FIGS. 4 and 6 show a tool holder, generally indicated by the numeral 81, of the type which is adapted to be used in the present invention. As sown in FIG. 6, the tool holder 81 is adapted to carry conventional cutting tools as a face milling cutter tool generally indicated by the numeral 82. The tool 82 may be secured to the holder 81 by any suitable means. The holders 81 are each provided with a peripheral, substantially Y-shaped groove as indicated by the numeral 83, which is adapted to receive the locking plunger 84 on the tool transfer arm 66.

The transfer arm 66 is automatically locked to a tool holder 81 by the locking pin structure shown in FIGS. 3 and 8. As best seen in FIG. 3, a locking plunger 84 slidably mounted in a longitudinal bore 86 formed in the tool transfer arm 66 and it has a pointed nose which is adapted to extend into the V-shaped groove 83 on the tool holder 81 and engage the groove surfaces at a point below a diameter line passing through the center of the tool holder 81 and the center of the tool transfer arm pivot shaft 57. As shown in FIG. 3, the inner end of the locking plunger 84 is provided with a wedge face 86 that is adapted to be engaged by a wedge face 87 formed on the outer end of a cylinder rod 88. The cylinder rod 88 is carried by a piston 89 of a hydraulic cylinder generally indicated by the numeral 90. A spring 91 normally biases the piston 89 toward the plunger 84 so that the plunger 84 is pushed automatically outward into locking engagement with the surfaces of the groove 83 when the transfer arm 66 engages a tool holder 81. The pointed nose of the locking plunger 84 will automatically center the tool holder 81 in the tool transfer arm 66. The numeral 92 designates a fluid inlet port through which hydraulic fluid is admitted to move the piston 89 upwardly, as viewed in FIG. 3, to release the plunger 84 and release the tool holder 81 from locking engagement with the tool transfer arm 66.

TOOL TURN AROUND MEANS

Figure 5:
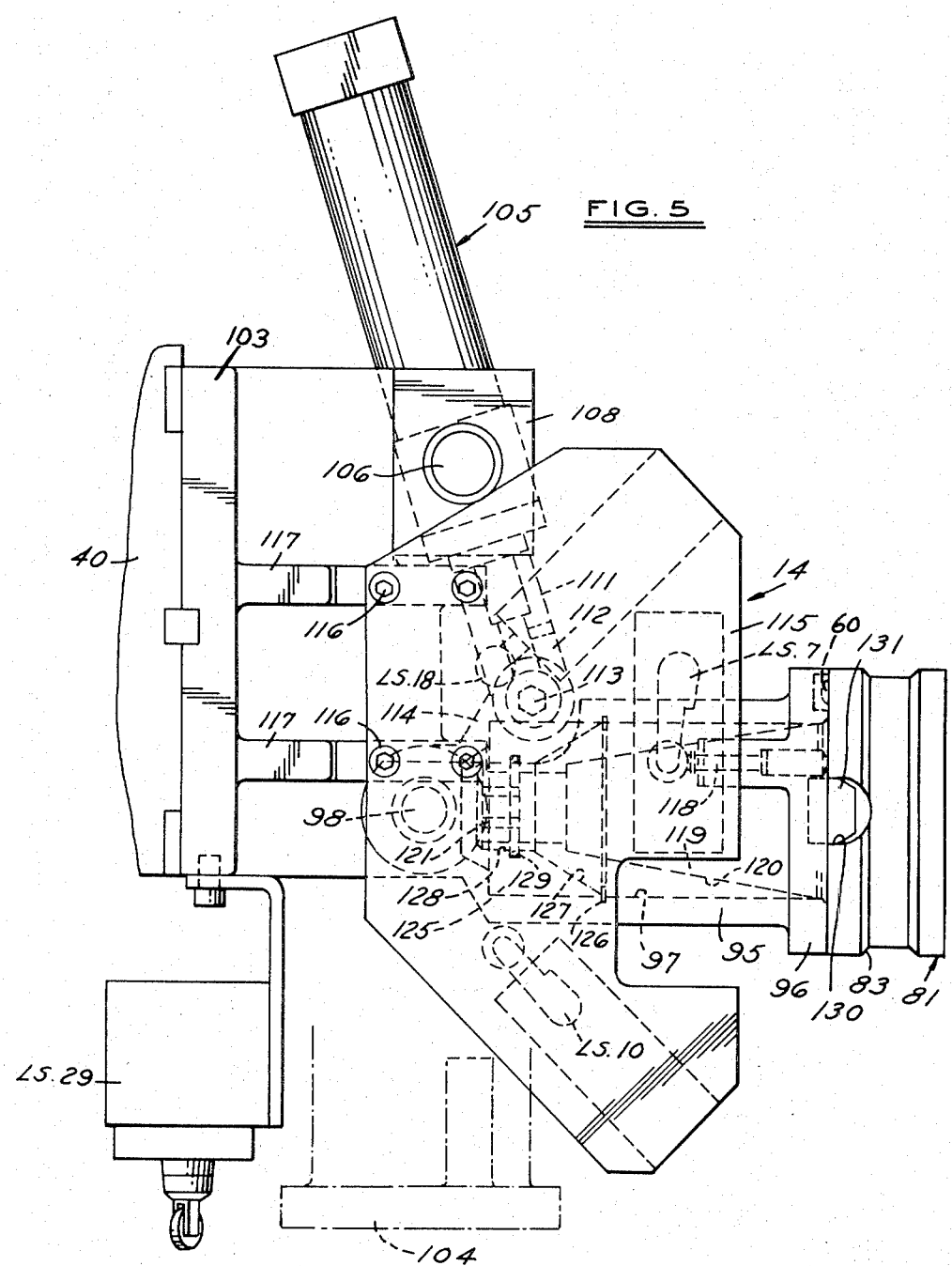
FIG. 5 is a fragmentary, enlarged, horizontal view of the structure illustrated in FIG. 4, taken along the line 5—5 thereof, and looking in the direction of the arrows.

The tool turn around means 14 can be seen in FIGS. 1, 2, 3, 4, 5 and 8. As best seen in FIG. 5, the tool turn around means 14 includes a tool pot 95 and has a cylindrical body in which is formed a cylindrical chamber 97 that is open at the outer end thereof. A flange 96 is formed around the tool pot 95 and around the open end of the cylindrical chamber 97.

As shown in FIG. 4, the tool pot 95 is rotatably mounted on a vertical shaft 98 by a pair of needle bearings 99 and 100. The shaft 93 is mounted between a pair of vertically spaced apart, horizontal yoke arms 101 and 102 which are carried by a support bracket 103 that is secured to the machine crown 40. FIGS. 1, 2, 3, 4 and 5 show the tool pot 95 in a first position where it may have a tool holder as 81 inserted therein or removed therefrom by the tool transfer arm 66. The dotted line position 104 in FIG. 5 designates a position wherein the tool pot 95 has been swung clockwise, as viewed from above the tool pot 95, to a forwardly facing position where it may have a tool holder as 81 inserted therein or removed therefrom by the second tool transfer means 16. FIG. 8 shows the last two mentioned sideward facing and forward facing positions of the tool pot 95 as being indicated by the numerals 95 and 104, respectively.

The tool pot 95 is adapted to be rotated between the load and ready positions, as shown in FIG. 8, by a hydraulic cylinder generally indicated by the numeral 105 in FIGS. 5 and 8. As best seen in FIG. 3, the cylinder 105 has the rod end thereof pivotally mounted on a pair of vertical shafts 106 and 107, by suitable bearing means, on the horizontal support brackets 108 and 109. The support brackets 108 and 109 are carried by the support bracket 103 which is secured to the machine crown 40 by any suitable means.

As shown in FIGS. 3 and 5, the hydraulic cylinder 105 is provided with the usual cylinder rod 111 which is fixed to a pivot joint plate 112 by any suitable means. The joint plate 112 is hingedly connected by means of the shoulder screw 113 and suitable bearing means to a turn arm 114 which is integrally formed on one side of the tool pot 95.

As shown in FIG. 5, the tool pot 95 is provided with a switch operating rod 118 for operating a limit switch LS-7 which is mounted on the lower side of a horizontal support plate 115. The support plate 115 is secured to the support bracket members 117 which are integrally formed on the support bracket 103. The plate 115 is secured in place by any suitable means as by the screws 116. The plate 115 also carries a second limit switch LS-10 which is also operated by contact with the tool pot 95 when the pot reaches the ready position as shown in FIG. 8. Limit switch LS-18 is adapted to be operated when the tool pot 95 reaches the load position (FIG. 5).

As shown in FIG. 6, the tool holder 81 is provided with a tapered body 119 which is connected to a splined tail 121 by a reduced diameter body rear end portion 122. The taper 120 on the tool body 119 is preferably a NO. 50 NMTB taper.

As shown in FIG. 5, the tool pot 95 is provided with a tool holder retainer member 125 which is cylindrically formed and seated in the inner end of the cylindrical bore 97. The retainer member 125 is releasably secured in place by a retainer ring 126. The retainer member 125 is provided on the outer end thereof with a converging recess 127 that terminates at its inner end at a cylindrical socket 128. A spring ring 129 is disposed in a circular groove formed in the wall of the socket 128 for frictional engagement with the splined tail 121 of a tool holder 81 for releasable gripping engagement therewith when a tool holder 81 is inserted into the tool pot 95, as shown in FIG. 5.

As shown in FIG. 5, the tool pot 95 is provided with a fixedly mounted circular key 131 that extends axially outward therefrom and into a slot 130 formed in the periphery of the tool holder 81. The key 131 functions with the slot 130 to locate the tool holder 81 in a predetermined position in the tool pot 95. The tool holder 81 may be provided with a second key slot 130 at a point diametrically opposite to the slot shown in FIG. 5.

As shown in FIG. 3 each of the tool carriers 48 carried on the tool storage chain 41 is also provided with a similar locating key as 132, and it functions in the same manner as the key 131 on the tool pot 95. As also seen in FIG. 3, the tool carriers 48 are provided with a retainer member 133 which is similar to the retainer member 125 and which is secured in place by a retainer ring 134. The retainer member 133 is also provided with a converging recess 135 that terminates at the cylindrical socket 136 in which is seated the spring ring 137 that functions in the same manner as the spring ring 129 when a tool holder 81 is mounted into a tool carrier 48.

THE SECOND TRANSFER MEANS

As shown in FIGS. 1, 2, 4 and 9, the second tool transfer means includes a tool transfer arm 140 which is mounted on an oscillating, rotary shaft 141 at a central point on the arm 140. The tool transfer arm 140 is provided with a C-shaped tool holder engaging portion 142 at one end and a similar tool holder engaging portion 143 at the other end. The tool holder engaging portions 142 and 143 are disposed in opposite facing positions and function in the same manner as described hereinbefore for the C-shaped tool holder engaging portion 89 on the tool transfer arm 66. The tool holder engaging portions 142 and 143 are provided with locking plungers 144 and 145, as shown in FIG. 4, and these locking plungers function in the same manner as the locking plunger 84 on the tool transfer arm 66. The fluid cylinders, springs and wedges for operating the plungers 143 and 144 are shown diagrammatically in FIG. 9.

The tool transfer arm shaft 141 extends into a fluid cylinder housing 146 in which is carried a pair of gear racks 147 and 148. As shown in FIG. 9, the gear racks 147 and 148 are adapted to mesh with gear teeth formed on the shaft 141 for rotating the tool transfer arm 140 between the load and clear positions shown in FIG. 9, as described in detail hereinafter. The gear racks 147 and 148 form the cylinder rods of suitable hydraulic cylinders 149 and 150.

As shown in FIG. 9, the fluid cylinder housing 146 is carried on a slide 153 which is adapted to extend and retract the tool transfer arm 140 for inserting and removing tools from the tool spindle 12. The slide 153 is operatively mounted on the tool spindle slide 159. As shown in FIG. 9, the housing slide 153 is provided on the inner end thereof with a gear rack that is meshed with a drive gear 154. The drive gear 154 is carried on a driven gear shaft 155 that is meshed with and driven by a second rack gear shaft 156. The rack gear shaft 156 is connected to the cylinder rod of a pair of piggyback mounted hydraulic cylinders 157 and 158. It will be seen that the hydraulic cylinders 157 and 158 function to operate the last described gear train to extend or retract the tool transfer arm 140 relative to the spindle 12.

TOOL SPINDLE

As shown in FIG. 1, the tool spindle 12 is rotatably supported on a tool spindle slide 159 that is slidably mounted on the vertical ways 160. The ways 160 are formed in the usual manner and are fixed to the vertical front face of the column 37. The spindle slide 159 is adapted to be moved upwardly and downwardly along the "Y" axis by any suitable means, as for example, by an electric drive motor indicated in FIG. 1 by the numeral 161. The drive motor 161 drives a lead screw 162 which is connected to a nut member (not shown) carried in the usual manner in the spindle slide 159.

As shown in FIG. 8, the spindle slide 159 is provided with a hydraulic counterbalancing system to overcome the gravity effect on the massive spindle slide 159. A pair of cables 163 and 164 have one end secured to the spindle slide 159. The cables 163 and 164 extend upwardly and are trained over the idler pulleys 165 and 166, respectively, which are operatively mounted on the shaft 167. The cables 163 and 164 extend rearwardly in a horizontal manner and they are trained over the idler pulleys 168 and 169, respectively. The pulleys 168 and 169 are operatively mounted on a transversely disposed pulley shaft 170. The other ends of the cables 163 and 164 are suitably connected to the cylinder rods 171 and 172 of a pair of counter-weight hydraulic cylinders 173 and 174, respectively.

Figure 7:
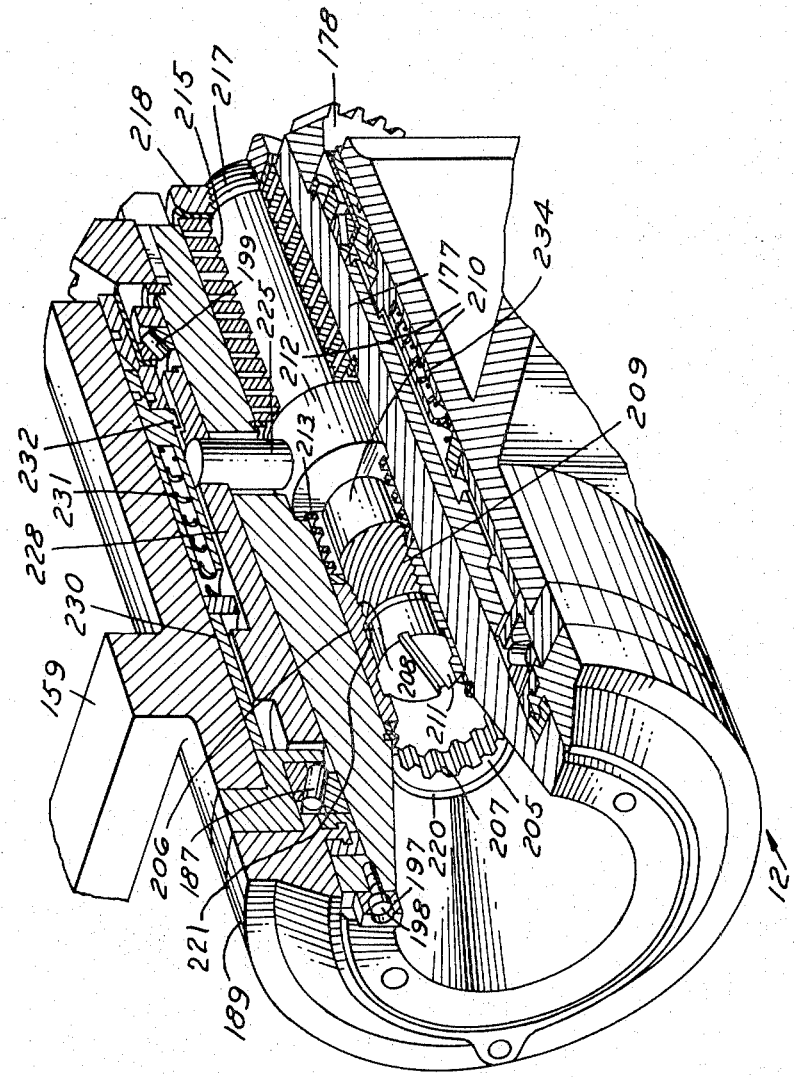
FIG. 7 is a fragmentary perspective view, partly in section, of the tool spindle structure of FIG. 6; and, FIGS. 8 and 9 comprise an illustrative hydraulic and drive control system for controlling the operation of the illustrative machine tool.

As shown in FIGS. 6 and 7, the tool spindle 12 includes a tubular spindle shaft 177 which is horizontally disposed and provided on the rear end thereof with a bevel drive gear 178. The bevel gear 178 is secured to the spindle shaft 177 by any suitable means, as by the circular retainer ring 179 and socket head screws 180. The bevel gear 178 is meshed with and driven by a similar bevel gear 181, as indicated in FIG. 6. The bevel gear 181 is fixedly mounted on a tubular drive shaft 182 which is driven by a vertical drive shaft 184. The tubular shaft 182 is concentrically mounted about the vertical drive shaft 184. A slidable, driving connection is reflected between the shafts 182 and 184 by a bronze key 182 which is carried by the tubular shaft 182 and slides in a suitable longitudinal key slot formed in the outer surface of the shaft 184. The numeral 185 in FIG. 6 designates a flexible dirt cover which is cylindrically mounted about the drive shaft 184 and is attached at its lower end to the spindle slide 159 and at its upper end to a shaft bearing journal structure 186. The bearing journal structure 186 operatively journals the upper end of the drive shaft 184.

As best seen in FIG. 6, the spindle shaft 177 is rotatably supported at its front end by the front roller thrust bearing 187 which is operatively supported in the front bearing housing 188. The front bearing housing structure 188 is retained axially in position by the spindle flange 189 and an airblow structure which functions as described hereinafter. The bearing retainer structure 188 has a rearwardly extended annular postion which is seated in the bore 190 that is formed in the spindle slide 159.

Lubricating fluid is conveyed to the bearing means 187 through passageways as 191 which are connected at the outer end thereof to a suitable tubing 192. The tubing 192 is connected to a suitable source of lubricating fluid.

As shown in FIG. 6, the spindle 12 is provided at the front end thereof with an air-blow arrangement which comprises a plurality of air passages 193 that are disposed at an angle which converge towards the axis of the spindle 12 and discharge air under pressure in front of the spindle to form a constant air ring while the machine is running. The air ring thus formed blows all dirt away from the tool spindle 12. During a machining operation, the air pressure is maintained at a low pressure and during a tool changing operation, the pressure is increased to provide a high blowing pressure to blow away chips and dirt on the tools. The air passages 193 are connected at their inner ends to a circular passage 194 which is connected to an inlet passage 195. An air supply tubing 196 is threadably mounted in the outer en of the passage 195 for supplying air under pressure to the last mentioned air passages. The tubing 196 would be connected to a suitable source of air under pressure.

As shown in FIG. 6, the tool spindle 12 is provided with an axially extended drive key 197 which is adapted to be seated in the key slot 130 formed in the tool holder 81 for driving the tool 82. The key 197 is secured to the spindle flange 189 by the socket head screw 198.

The spindle shaft 177 is rotatably supported at the rear end thereof by the rear roller thrust bearing 189 which is operatively supported in the bore 190 by the bearing housing 200. The bearing 199 is secured against outward axial movement by any suitable means as by the locking ring 201. As shown in FIG. 6, a port 202 is provided for access to adjust the bearing lock nut 201.

As best seen in FIG. 6, the spindle shaft 177 is provided at the forward end thereof with a tapered bore 203 in which is seated the tapered body 119 of the tool holder 81. The tapered bore 203 terminates at its inner end with an axially extended bore 204 in which is slidably mounted a draw sleeve shaft 205. The sleeve shaft 205 is provided with an axially extended stepped bore therethrough as indicated by the numeral 206. Formed in the outer end of the bore 206 is a female or internal spline 207 which is adapted to mesh with the spline 121 formed on the tail of the tool holder 81. It will be seen that the spline 121 on the tail of the tool holder 81 is adapted to be slid completely through the female spline 207 when the tool holder 81 is fully mounted into the tool spindle 177 so that the sleeve shaft 205 may be rotated slightly to bring the female spline teeth 207 behind the teeth of the spline 121 and draw the tool holder 81 inwardly into seating engagement in the splindle shaft 177.

As shown in FIG. 6, sleeve shaft 205 is provided at the rear end thereof with the internal or female helical gear teeth 208 which are adapted to mesh with a mating helical gear 209 that is formed on the front end of a draw shaft 210. A cap 211 is threadably mounted on the front end of the shaft 210 and it abuts an internal shoulder 221 which is formed on the slleve shaft 205 at the forward end of the female helical gear teeth 208. It will be seen that when the shaft 210 is drawn inwardly, the sleeve shaft 205 will be rotated to turn the female spline 207 to a position in back of the spline teeth on the spline 121 and also draw the tool holder 81 inwardly, as more fully explained hereinafter. As shown in FIG. 6, the draw shaft 210 is provided with an enlarged portion or shoulder 212 which is slidably mounted in an enlarged axial bore 222 that communicates its forward end with the bore 204. A coil spring 213 is mounted in the bore 204 around the front end of the shaft 210 and its rear end abuts the shoulder 212 and its front end abuts a thrust washer 214 disposed at the rear end of the sleeve shaft 205.

As shown in FIG. 6, a second coil spring 215 is mounted in the bore 222 around the rear end of the shaft 210. The forward end of the spring 215 abuts a thrust washer 216 which is secured against endwise movement by a retainer ring 223. The rear end of the spring 215 abuts a thrust washer 224 which is secured in place by the lock nut 218 that is threadably mounted on the threaded rear end 217 of the shaft 210. The forward end of the sleeve shaft 205 is adapted to abut a thrust washer 219, which is secured in place by a retainer ring 220, when the sleeve 205 is moved forwardly to release a tool holder 81. As shown in FIG. 6, the sleeve shaft 205 has been pulled inwardly or to the left, as viewed in FIG. 6, to draw the tool holder 81 into the spindle shaft 177 and secure it in place for a driving operation of the tool 82.

The sleeve shaft 205 is drawn inwardly into the bore 204 by the following described structure. As shown in FIG. 6, a cross pin 225 is mounted through a suitable bore in the shaft shoulder portion 212. The cross pin 225 extends through a transverse bore 226 formed through the spindle shaft 177 and the ends thereof are seated in the bores 227 which are formed in a release sleeve 228 which is mounted around the spindle shaft 177. The cross pin 225 is secured to the release sleeve 228 by the longitudinally disposed screw 229. It will be seen that the release sleeve 228 is adapted to be moved axially relative to the spindle shaft 117, and that during its movement it will carry the cross shaft 225 which in turn will move the draw shaft 210. The spring 215 functions to draw the shaft 205 to the left, or inwardly, to draw the tool holder 81 inwardly, and the release sleeve 228 is adapted to move the shaft 210 forwardly in the other direction to release the tool holder 81. The spring 213 functions to momentarily hold sleeve shaft 205 against the thrust washer 219 during the initial inward drawing movement of shaft 210. This holding action of spring 213 permits the shaft 210 to be drawn inwardly, causing sleeve shaft 205 to rotate radially ½ spline tooth prior to the cap 211 being engaged with the shoulder 221 (FIG. 6) on the sleeve shaft 205. The shaft 210 and sleeve shaft 205 then continue to move axially backward in a linear manner causing spline teeth 207, now in line with the teeth of spline 121, to pull the tapered body 119 of tool holder 81 into the tapered bore 203.

The release mechanism works in a reverse manner. The release sleeve 228 is adapted to be moved longitudinally forward from its normal position shown in FIG. 6 by the following described structure. As shown in FIG. 6, the numeral 230 designates a cylindrical piston which is slidably mounted in the bore 190 and which is normally biased to the left, or to the inoperative position, as viewed in FIG. 6, by a plurality of coil springs 231. The piston 230 is provided with an inwardly extended ring or projection 232 which is adapted to engage an annular shoulder 233 formed on the release sleeve 228 for pushing engagement therewith. The springs 231 are mounted in axial or longitudinal bores 234 that are formed on the front end of the piston 230. The outer end of each of the springs 231 is adapted to engage a circular stop member 235. An annular chamber or cylinder 236 is formed at the front end of the piston 230. The fluid chamber 236 is adapted to be supplied with hydraulic fluid under pressure through a passage 237 from a suitable source of hydraulic fluid as indicated by the numeral 238 in FIGS. 1 and 9.

As shown in FIG. 6, the release sleeve 228 is retained against rotation relative to the spindle shaft 177 by the key 239 which is secured to the spindle shaft 177 by the socket head screw 240. The key 239 is slidably mounted in a key slot 241 formed in the release sleeve 228. The key 239 permits the release sleeve 228 to be moved longitudinally relative to the spindle shaft 117 for a tool holder releasing action when the piston 230 is moved to the right as viewed in FIG. 6. When the relase piston 230 is moved to the right, as viewed in FIG. 6, the inwardly extended ring 232 engages the shoulder 233 on the release sleeve 228 and the release sleeve 228 is moved linearly in a longitudinal direction to provide the shaft 210 and the sleeve shaft 205 with similar linear, longitudinal movements. The sleeve shaft 205 is moved linearly throughout the length of the gap 176 and into a stopping engagement with the thrust washer 219. The shaft 210 continues to move longitudinally in a linear manner and thereby provides a rotational movement to sleeve shaft 205 to allow the spline teeth 207 on the sleeve shaft 205 to be moved ½ spline tooth out of alignment with the spline teeth 121 on the tail end of the tool holder 81. During the rotational movement of the sleeve shaft 205, the shaft 210 moves to the right, as viewed in FIG. 6, and the cap 211 is unseated from the shoulder 221. The cap 211 on the shaft 210 moves for a distance of approximately 3/16 inch after it is unseated from the shoulder 221, and during the last 0.020 inch of said 3/16 inch movement, the cap 211 bumps the tail of the tool holder 81 to break the frictional hold of the tapered bore 203 on the tapered body 120 of the tool holder 81.

As shown in FIG. 8 the spindle vertical drive shaft 164 is driven by a suitable electric drive motor 242 and gear drive means 243 located in the rear base 38. The gear drive means 243 is operatively connected to an automatic tool spindle positioning mechanism comprising a gear drive train 245 and a hydraulic cylinder 246 by an overrunning clutch 244. The clutch overruns in the clockwise direction and the gear drive operates in the counterclockwise direction.

OPERATION

It will be understood that any suitable electric control circuit may by employed for controlling the various electric drive motors, solenoids, and other apparatuses used for controlling the operation of the hydraulic units shown in FIGS. 8 and 9, since control circuits of the type are within the realm of selection by a skilled mechanic. A machining apparatus made in accordance with the principles of the present invention may also be controlled by a suitable numerical control system, as for example, a "NUMERA-TROL" positioning control system available on the market from the Ex-Cell-O Corporation of Detroit, Michigan. The last mentioned positioning system is programmed incrementally, (4) axis, accepting tab sequential data. It will accommodate the positioning of all linear axes as well as 360 discrete positions of the rotary axis. It will accept and control all feed rates and rapid traverse rates. It will control all spindle speed selections and directions, coolant On-Off situations, the entire cycle and desired sequence of automatic tool changing, and other control factors.

The tools 82 and the holders 81 are manually inserted into the tool carriers 48 carried on the tool storage conveyor. The tool storage conveyor is jogged to new positions to enable the operator to continue to insert tools through the doors of the housing 44. The tools 82 are inserted into the tool storage means 13 in their desired sequence. After the tool storage conveyor has been loaded, the housing doors as 47 are closed, so as to trip the safety inner lock switches LS-1 and LS-2 (FIG. 8) so that the machine will operate.

A machining cycle is started by the operator pressing the start switch of a suitable electric control circuit for the machine. Solenoids 1-A and 2-B (FIG. 8) will first be energized to operate the fluid control valve 243 and 250 to admit fluid under pressure from the fluid supply lines 247 and 248 to the tool storage conveyor drive motor 57. The fluid supply lines 247 and 248 are connected to the source of pressurized fluid 238 shown in FIG. 9. The tool storage conveyor is moved at a high speed until the first tool trip dog 60 trips limit switch LS-3 (FIG. 8), just prior to reaching a tool transfer position.

The tripping of limit switch LS-3 de-energizes solenoid 2-B changing the conveyor speed to low. Simultaneously, solenoid 1-B is energized to shift the valve 249 until the first tool in the tool storage conveyor reaches the exact tool transfer position, at which time the photo cell transducer PC-1 generates a signal to de-energize solenoid 1-B, shifting the valve 249 to the closed center position and locking the tool storage conveyor in the exact tool transfer position.

The PC-1 signal, together with LS-7 (tool present switch adjacent the tool pot 95) if untripped, LS-8 (first transfer arm retract), LS-9 (first transfer arm clear), and LS-18 (tool turn around "load" position) tripped, will energize solenoids 3-A, 4-A and 5-B and de-energize solenoids 3-B, 4-B and 5-A, to shift the fluid control valves 251, 252 and 253. The last described action causes the tool transfer arm 65 to rotate clockwise 180° until it completely surrounds the tool transfer position and trips limit switch LS-4 (transfer position). Solenoid 6-B is simultaneously energized, holding the tool locking plunger 84 in a free position.

Limit switches LS-4 and LS-8 (tool transfer arm 66 retracted) together will energize solenoid 7-A and de-energize solenoids 6-B and 7-B, to shift the fluid control valve 254 and 255. This action removes the tool 82 from the tool storage conveyor and trips limit switch LS-5 (tool transfer arm 66 extended). De-energizing solenoid 5-B causes the wedge operated tool locking plunger 84 to confine the tool 82 in the arm 66.

Limit switch LS-5 energizes solenoids 3-B, 4-B and 5-A and de-energizes solenoid 3-A, 4-A and 5-B to shift the valves 251, 252 and 253. The tool transfer arm 66 rotates 180° counterclockwise to the unload position, directly over the 90° tool turn around means 14, and trips limit switch LS-6 (tool transfer arm 66 in unload position).

Limit switch LS-6 energizes solenoid 7-B and de-energizes solenoid 7-A, shifting valve 254, causing the tool 82 to be deposited into the 90° tool turn around pot 95; the tool 82 trips limit switch LS-7. Limit switch LS-8 is tripped when the tool transfer arm 66 is completely retracted.

Limit switch LS-8 energizes solenoid 5-B and 6-B and de-energizes solenoid 5-A to shift the valves 252 and 255, respectively. This action causes the tool locking plunger 84 to retract and the tool transfer arm 66 is rotated 20° counterclockwise to the "clear" position, tripping limit switch LS-9. Solenoids 3-B and 4-B are held energized and solenoids 3-A and 4-A are de-energized.

Limit switch LS-9 energizes solenoid 8-A and de-energizes solenoid 8-B to shift valve 256. This action causes the 90° tool turn around pot 95 to rotate, placing the tool 82 in the "ready" position and tripping limit switch LS-10 (90° tool turn around in "ready" position). Limit switch LS-9 simultaneously energizes solenoid 1-A, to shift valve 249, causing clockwise slow rotation, advancing the tool storage conveyor to the next position. PC-1 will identify the exact position and de-energize solenoid 1-A, shifting valve 249, and stopping the tool storage conveyor at once.

At the completion of the previous machining operation, the spindle 12 would have been stopped and the spindle positioning cylinder solenoids 17-B and 20-B would have been energized, shifting valves 257 and 258, if necessary, rapidly rotating the spindle 12 until the transducer PC-8 deenergizes solenoid 20-B. The spindle 12 then continues to rotate slowly until the transducer PC-2 indicates that the tool change spindle position is reached, immediately re-braking the spindle 12 at that position.

The command to return to origin causes solenoid 9-A to be energized and 9-B to be de-energized, shifting valve 259, extending the tool changer slide 153 to "pick-up" position, tripping LS-11 (tool changer slide 153 in pick-up position, semi-extended). Solenoid 12-B is held energized and solenoid 12-A is de-energized, shifting valve 260.

At the same time the spindle 12 was being positioned, the tool spindle slide 159 would have been rapid returning up to the tool change position, tripping limit switch LS-21 and limit switch LS-21A (origin position). Tripping limit switch 21 drops out the rapid feed and the system then "slow feeds" into limit switch LS-21A which shifts the feed motor 242 into "creep" speed and PC-6 (photo-cell transducer to control motor 242--not shown) stops spindle slide 159 at origin.

Total transfer arm 140 will still be at "clear" position, tripping either limit switch LS-16 (tool transfer arm 140 in "clear" position, 60° from tool spindle 12) or limit switch LS-23 (same as LS-16).

With transducer PC-2, limit switches LS-10, LS-11, LS-21A and LS-23 tripped, solenoid 10-A is energized and solenoid 10-B is de-energized, shifting valve 261. Solenoids 13-B, 14-B and 15-B are held energized and solenoids 13-A, 14-A, 15-A and 11-B are de-energized, shifting valve 262, 263 and 265. This action causes rotation of the tool transfer arm 140, 60° counterclockwise to the "load" position, surrounding the tool 82 in the spindle 12 and the tool 82 in the tool turn around pot 95, tripping limit switch LS-12 (tool transfer arm 140 in load position over spindle 12 and tool turn around pot 95). As solenoid 11-B was already de-energized, the tool locking plungers 144 and 145 were free to slip onto the tools 82.

Limit switch LS-12 energizes solenoid 11-B, shifting valve 264, unclamping the tool 82 in the spindle 12, tripping limit switch LS-13, and simultaneously releasing the tool locking plungers 144 and 145 securing the tools 82 in the tool transfer arm 140. Limit switch LS-13 energizes solenoid 12-A and de-energizes solenoid 12-B, shifting valve 260, fully extending the tool changer slide 153, removing the tools 82 from the spindle 12 and tool turn around pot 95, tripping limit switch LS-14 (fully extended position of tool transfer arm 140). The tripping of limit switches LS-14 and LS-12 energizes solenoids 10-B, 13-A and 14-A and de-energizes solenoids 10-A, 13-B and 14-B, shifting valves 261, 262 and 263. Solenoid 15-B is held energized and solenoid 15-A is de-energized, shifting valve 265. This action causes 180° counterclockwise rotation of the tool transfer arm 140, tripping limit switch LS-15. Limit switch LS-15 (tool transfer arm 140 in load position over spindle 12 and tool turn around pot 95) energizes solenoid 12-B and de-energizes solenoid 12-A, shifting valve 260, retracting the tool changer slide 153, inserting the tools 82 into the spindle 12 and tool turn around pot 95, and tripping limit switches LS-11 and LS-29 (tool fully inserted in spindle). Limit switch LS-11 de-energizes solenoid 11-B, shifting valve 264, freeing the tool locking plungers 144 and 145 and clamping the tool 82 in the spindle 12, and tripping limit switch LS-28 (tool in spindle clamped).

Limit switch LS-28 and limit switch LS-15 energize solenoid 15-A and de-energize solenoid 15-B, shifting valve 265. Solenoids 10-B, 13-A and 14-A are held energized, and solenoids 10-A, 13-B and 14-B are already de-energized. The tool transfer arm 140 will rotate 60° clockwise to the "clear" position, tripping limit switch LS-16. The spindle slide 159 starts lowering and a machining cycle begins. The command "slide down" energizes solenoid 9-B and de-energizes solenoid 9-A. shifting valve 259, withdrawing the tool changer slide 153 and tool transfer arm 140 from the cutting area and moving them to the storage position, fully retracted. Coolant is turned on automatically as well as spindle rotation. Solenoid 8-B is also energized and solenoid 8-A de-energized, shifting valve 256, rotating the tool turn around pot 95 to the "load" position, and tripping limit switch LS-18.

Anytime it is necessary to index the work table 18 during the machining cycle, the programmer must specify the "Z" axis position. Solenoid 16-B can then be energized, shifting valve 266, raising the tables 18 and 19 0.100 inch, releasing limit switch LS-20 (table down-lock) and tripping limit switch LS-19 (table up-unlock). The motor 20 will then rotate the tables 18 and 19 at 10 RPM in the programmed direction. Transducer PC-3 (table rotation transducer—not shown) will give a signal every 0.1° of table rotation, or 3,600 signals per revolution of the tables 18 and 19, providing for 360 discrete positions. It will be necessary to count these signals to determine the desired stopping position of tables 18 and 19. This count should slow down the tables 18 and 19 prior to reaching the desired position and when the proper pulse count is obtained, the motor 20 will be braked dynamically, and the tables 18 and 19 will be immediately stopped at the exact position, maintaining the signal from PC-3. PC-3 de-energizes solenoid 16-B and springs will lower the tables 18 and 19, tripping limit switch LS-20. The table 18 will then return to machining position and the cycle will continue.

During the machining cycle, the aforedescribed steps are repeated to load a tool 82 in the 90° tool turn around pot 95 and turn the pot 95 to the "ready" position. The next series of steps is the same as described hereinbefore for transferring a tool 82 from the 90° tool turn around pot 95 to the spindle and to unload a used tool and place it in the 90° tool turn around pot 95, except the motion of the tool transfer arm 140 is opposite to the previously described loading operation. The used tool 82 is unloaded from the 90° tool turn around pot 95, the tool storage conveyor is indexed, and a new tool 82 is loaded into the 90° tool turn around pot 95 and the pot 95 is turned back to the "ready" position for another tool changing operation by the tool transfer arm 140. With the sequence type of tooling, each tool 82, as it is removed from the machine, is replaced one conveyor tool carrier 48 behind its original position.

When manually loading extra long tools into the 90° tool turn around pot 95, the following procedure is followed. The normal carrier 48 for the extra long tool, in the storage conveyor, must be left empty. The tool transfer arm 66 will go through a dry cycle, in attempting to load the blank tool into the 90° tool turn around pot 95. The tool transfer arm 66 will move to the "clear" position and then the program will be interrupted to allow the manual loading of the extra long tool into the 90° tool turn around pot 95. As soon as the extra long tool is loaded into the 90° tool turn around pot 95, the machine will be manually returned to automatic operation. During the normal program, the extra long tool will finish its machining, be removed from the spindle 12 and be placed in the 90° tool turn around pot 95, which will turn it 90° to the load position. The program will then be interrupted and the extra long tool manually removed. The normal program will then be manually restarted. The programmer must provide for this sequence.

Experience has shown that the changing of numbers or sizes of tools 82 has no effect on machine accuracy. The tool changing system of the present invention can be programmed so that its operation makes only a minimal intrusion into the machining cycle time, as for example, 5 seconds. The operator has instant control of all machine functions from the operator's position and he can see all functions take place as he commands. The construction and arrangement of the tool holders 81 and the tool handling structure makes it possible to use larger tools and standard tools.

While it will be apparent that the preferred embodiment of the invention herein disclosed is well calculated to fulfill the objects above stated, it will be appreciated that the invention is suceptible to modification, variation and change without departing from the proper scope or fair meaning of the subjoined claims.

I claim:

1. A tool holder having a forwardly tapered body portion adapted to be inserted in a tool holder receiving socket, comprising:
   a. tool gripping means at the forward end of said tool holder, said tool gripping means including:
      1. a V-shaped continuous peripheral groove adapted to receive a V-shaped tool holder gripping portion on a tool transfer arm;
   b. tool holding means at the other end of said tool holder adapted to be releasably secured by a draw shaft means; said tool holding means comprising:
      1. a narrowed cylindrical portion forming a peripheral groove adjacent said tapered rear body portion;
      2. radially outwardly extending spline teeth circumferentially spaced at the extreme end thereof adapted to cooperate with spline teeth on the end of said draw shaft means;
      3. said peripheral groove having a width slightly greater than the axial length of said spline teeth on the end of said draw sleeve shaft means;
   Whereby movement of said draw shaft means enables its spline teeth to move adjacent to said spline teeth on said tool holder, thereby providing a locking means between said tool holder and said draw shaft means.

2. In a tool holder as defined in claim 1 wherein said V-shaped groove includes a key slot means extending partially into said V-shaped groove.

* * * * *